United States Patent [19]
Hestich

[11] Patent Number: 4,718,279
[45] Date of Patent: Jan. 12, 1988

[54] DUAL BOURDON TUBE TYPE SENSING PRESSURE TRANSDUCER

[75] Inventor: John Hestich, Glendora, Calif.

[73] Assignee: Dwyer Instruments, Inc., Michigan City, Ind.

[21] Appl. No.: 936,366

[22] Filed: Dec. 1, 1986

[51] Int. Cl.⁴ .......................... G01L 7/04; G01L 9/04
[52] U.S. Cl. ........................................ 73/734; 73/736
[58] Field of Search ................. 73/736, 4 R, 708, 733, 73/734, 735

[56] References Cited

U.S. PATENT DOCUMENTS

| | | | |
|---|---|---|---|
| 2,068,663 | 1/1937 | Diehl | 73/736 |
| 2,403,256 | 7/1946 | Beck | 73/412 |
| 3,095,745 | 7/1963 | Kirwan | 73/736 |
| 4,374,475 | 2/1983 | Hestich | 73/736 |
| 4,385,525 | 5/1983 | Phillips et al. | 73/720 |

OTHER PUBLICATIONS

Mechanical Measurements, 2nd Ed., by Thomas G. Beckwith & N. Lewis Buck, pp. 126–128, Pub. 1969 by Addison-Wesley Pub. Co. Inc.
Hall Effect Transducers, by Micro Switch Div. of Honeywell, Pub. by Micro Switch Div., Freeport Ill., 1962.

Primary Examiner—Donald O. Woodiel
Attorney, Agent, or Firm—Mann, McWilliams, Zummer & Sweeney

[57] ABSTRACT

A pressure transducer in the nature of a differential pressure transmitter including an instrument housing defining a chamber in which is mounted a sensing transducer one of several known types powered to provide a gauge signal that is to be supplied to instrumentation such as a controller or recorder, with the pressure sensing arrangement of the instrument being in the form of two oppositely coiled bourdon tubes mounted one on either side of the sensing transducer, with like ends of the tubes each mounting an output lever, which levers are respectively resiliently connected to the movable element of the transducer and in an oppositely acting manner, with the other ends of the respective tubes being separately connected to a mounting block arranged to provide for connection of the respective tubes to separate, externally located, sources of pressure fluids, and with one of the output levers being adjustable as to length for calibrating the instrument so that the action of the two tubes on the sensing transducer may be made equivalent when equal static pressures are sensed by the respective tubes, this compensating for inequalities in the tubes to insure a "zero" readout of the instrument when the tubes sense equal static pressures.

14 Claims, 4 Drawing Figures

DUAL BOURDON TUBE TYPE SENSING PRESSURE TRANSDUCER

This invention relates to a dual bourdon tube type sensing pressure transducer arranged as a differential pressure transmitter of the type commonly known as "wet-wet", and sensing more particularly, to a sensing pressure transducer arranged for differential pressure sensing and transmitting purposes, in which instrument two bourdon tubes are the pressure detectors and act on the instrument sensing transducer to provide a differential pressure indicating signal that may be electrically supplied to instrumentation in the nature of a controller or a recorder, in which the instrument has calibration adjustability that insures that the two bourdon tubes will act equally when exposed internally (of the respective tubes) to equal static pressures.

Differential pressure transmitters are employed for a wide variety of commercial, industrial, and medical applications for, for instance, flow sensors, and control and/or record keeping purposes. Such devices include, for instance, a sensing transducer of the strain gauge type in conjunction with a differential pressure detector such as the arrangement disclosed in Phillips and Dirks U.S. Pat. No. 4,385,525, granted May 31, 1983 (the entire disclosure of which is incorporated herein by this reference), which is assigned to the assignee of the instant application.

In this type of device, the sensing transducer and the differential fluid pressure detectors of the instrument cooperate to create an electric signal that is in proportion to the difference in gas and/or air pressure or liquid pressures, sensed by the instrument, and that is electrically transmitted from the instrument to a suitable conventional indicating meter, a process controller, a computer, a recording device, etc.

However, the high and low pressure detectors of such instruments heretofore have usually been of the double diaphragam type, in which one diaphragm unit is to be connected to one source of gas and/or air pressure or liquid pressure, and the second diaphragm unit is to be connected to a second source of such pressure, with a sensing transducer of a suitable type, and associated electrical components, being operably associated therewith to create a signal that represents the differential pressure involved, and which is transmitted to the system controller, a computer, etc., for system control or for record making purposes. It is also common to have associated with the differential pressure transmitter a device for digital readout of the pressure monitored by the differential pressure transmitter, which may be looated adjacent to or removed from the differential pressure transmitter itself. In addition to leaf spring strain gauge transducers of the general type referred to, two other familiar types of sensing transducers are the capacitive type sensing transducers, see, for instance, Mechanical Measurements, 2nd Edition, by Thomas G. Beckwith and N. Lewis Buck, pages 126-128, and Hall effect sensing transducers, see, for instance, Hall Effect Transducers, by Micro Switch, a division of Honeywell, Freeport, Ill., pages 7-17, 134 and 135; the disclosures of these two publications are hereby incorporated herein by this reference.

In any event, differential pressure transmitters involving diaphragm type sensors are known to be large, cumbersome, heavy, complicated, delicate, and rather expensive.

It is a principal object of the present invention to provide a sensing pressure transducer in the nature of a differential pressure transmitter in which the instrument operates to sense differential gas and/or air pressures, or differential liquid pressures, by a dual bourdon tube detecting arrangement in which each tube is separately connected to separate sources of gas and/or air pressures, or separate sources of liquid pressures, and each tube acts oppositely on, for instance, the movable element or component, of a sensing transducer of one of the types mentioned, to provide the signal that is to be transmitted, with the instrument being arranged for ease of calibration to insure equal operation of the bourdon tubes when connected to equal static pressures.

A further principal object of the invention is to provide for differential pressure transmitters a differential pressure sensing instrument in which the pressure detecting devices are in the form of two oppositely coiled and acting bourdon tubes that are disposed one on either side of the movable element or component of a sensing transducer (of one of the types referred to) in which instrument, not only do the tubes confine the fluids being pressure monitored to the respective tubes, so that the pressure sensing instrument may be used in connection with corrosive gases or liquids, but without the complications and expense of conventional diaphragm instruments of the "wet-wet" type.

Another principal object of the invention is to provide for differential pressure transmitter systems, a pressure sensing and differential pressure signal providing transducer, in which the instrument involved includes dual differential pressure detecting or sensing bourdon tubes, arranged in such a manner that they are readily calibrated prior to use to insure that the instrument bourdon tubes, although two in number, act equivalently on the movable component of the sensing sensing transducer involved, when such tubes are exposed to equal static pressures, for insuring accuracy of the sensing transducer signal that is to be transmitted.

Still another object of the invention is to provide a differential pressure transmitter comprising a cooperating differential pressure sensing or detecting arrangement and a sensing gauge pressure transducer that cooperate to provide the differential pressure electrical signal of the transmitter, to provide a differential pressure transmitter that is compact in organization, economical of manufacture, easy to install and use, accurate and long lived in operation, and that may be employed in conventional differential pressure transmitter systems as the differential pressure transmitter instrument to replace the more expensive complicated diaphragm sensing instruments.

In accordance with the present invention, a differential pressure transmitter is provided comprising, for instance, a leaf spring type strain gauge pressure transducer instrument including a housing defining a chamber in which is mounted the leaf spring type strain gauge pressure transducer, that is arranged, for instance, as disclosed in said Phillips and Dirks U.S. Pat. No. 4,385,525, in which the strain gauge type sensing transducer involved forms an electro-mechanical transducer that is powered by an electronic circuit mounted inside the housing chamber which, when energized by connection to a suitable source of electrical energy, supplies a constant direct voltage to the leaf spring type strain gauge sensing transducer. Appropriately associated with the gauge sensing transducer are first and second bourdon tubes that are disposed one on either side of the sensing transducer in oppositely coiled form, with one end of each tube being sealed and mounting an output lever, with such output levers being disposed generally in parallelism to, for instance, the leaf spring (of the leaf spring type strain gauge transducer of the type indicated) in its neutral position or relation. The other ends of the respective bourdon tubes are connected to a mounting block that extends externally of the instrument and defines separate conduiting and a connection arrangement for each bourdon tube for respectively connecting them via the usual tube type connectors to the separate sources of gas and/or air pressures, or the separate sources of liquid pressures, that are to be monitored. The output levers of the respective bourdon tubes are resiliently connected to, in the present instance, the leaf spring adjacent its free end for essentially balanced biasing action of the output levers on the leaf spring. One of the indicated output levers is arranged to be adjustable lengthwise of same for setting the adjustable output lever at its effective length at which the two bourdon tubes react equivalently on the leaf spring when both are internally exposed to the same static fluid pressure at the respective pressure fluid sources. Where sensing transducers of either the capacitive type, or the Hall effect type are employed, the output levers of the bourdon types are appropriately connected to the movable element or component involved whereby the mechanical energy differential provided by the pressure detecting bourdon tubes is converted to electrical energy for forming the signal to be transmitted, which, for any of the sensing transducers mentioned, depends on the deflection of such movable element or component from a zero datum.

The differential pressure transmitter of the present invention is arranged to be calibrated before use, by adjustment of the indicated adjustable output lever, to compensate for inequalities in the two bourdon tubes employed, to insure a zero reading of the instrument whenever equal static fluid pressures are imposed on the respective bores of the tubes. The instrument chamber itself is not pressurized. As the fluid or fluids being monitored are confined to the bourdon tubes, the instrument is adapted to be employed in connection with either corrosive gases or corrosive liquids.

After calibration, when the instrument is installed as a differential pressure transmitter similar to the Dwyer Series 600 differential pressure transmitter illustrated and explained at pages 14 and 15 of Dwyer Instruments Inc. Bulletin E-50, where the indicated leaf spring strain gauge sensing transducer is employed, deflection of the leaf spring type strain gauge live length under the thrust involved in the deflection of the two bourdon tubes through their respective output levers, in response to fluid pressure applications to the respective bourdon tubes, unbalances the strain gauge from a null relation and effects a corresponding change in the strain gauge signal which is amplified and converted by the electronic circuit involved to a low amperage output that is supplied to instrumentation of the type indicated, such as a controller or recorder. Similar results are achieved where sensing transducers of either the capacitive type, or the Hall effect type, are employed instead of the leaf spring strain gauge type sensor transducer.

Other objects, uses, and advantages will be obvious or become apparent from a consideration of the following detailed description and the application drawings in which like reference numerals indicate like parts throughout the several views.

IN THE DRAWINGS

However, it is to be distinctly understood that the specific drawing illustrations provided are supplied primarily to comply with the requirements of the Patent Laws, and that the invention is susceptible of modifications and variations that will be obvious to those skilled in the art, which are intended to be covered by the appended claims.

GENERAL DESCRIPTION

Figure 1:
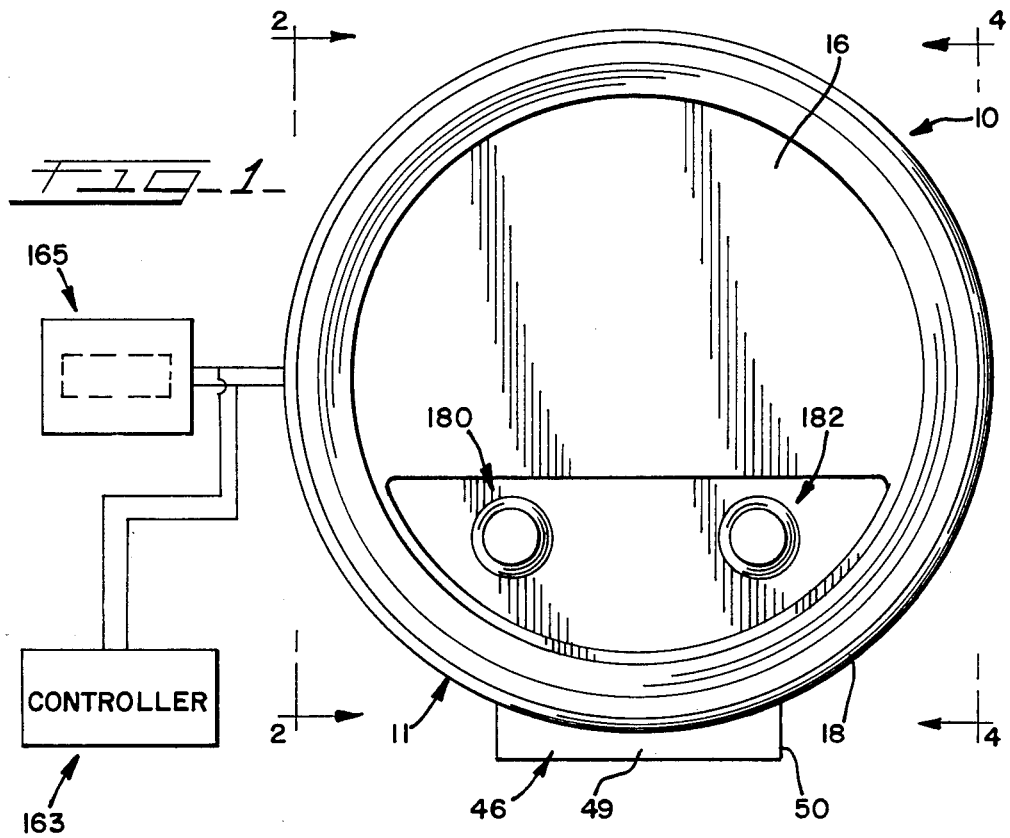
FIG. 1 is a face or top plan view of one embodiment of the instrument involved in invention, taken as viewed by an observer viewing the instrument from above the right hand side of FIG. 2, with the instrument being equipped with a leaf spring strain gauge type sensing transducer (of the type indicated), showing also a controller and digital readout device.
Figure 2:
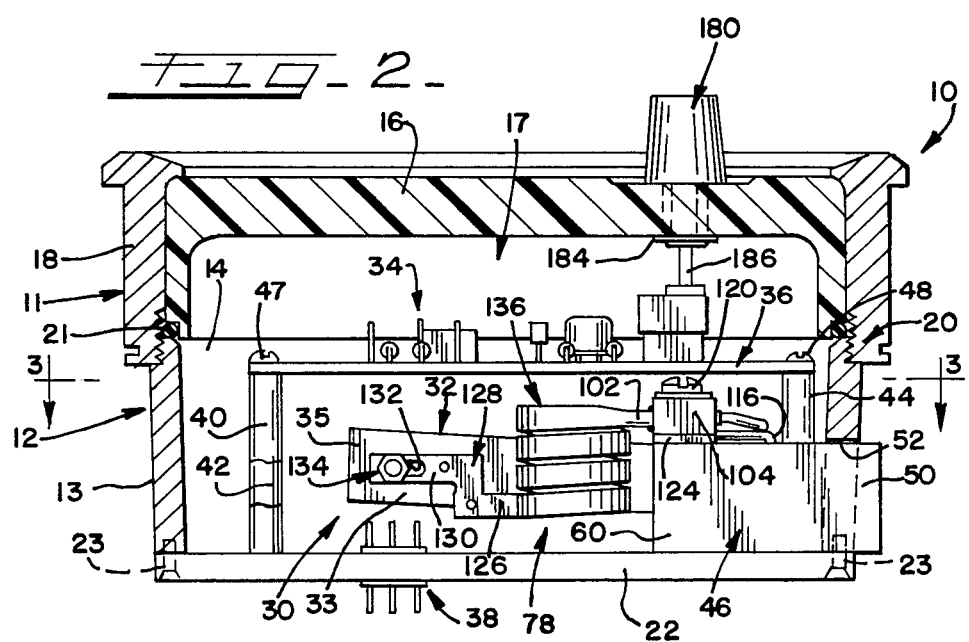
FIG. 2 is a side elevational view of the instrument involved, viewed as indicated by line 2—2 of FIG. 1, but with the instrument cover and cap (or bezel) shown in vertical section across the central axis of the instrument.
Figure 4:
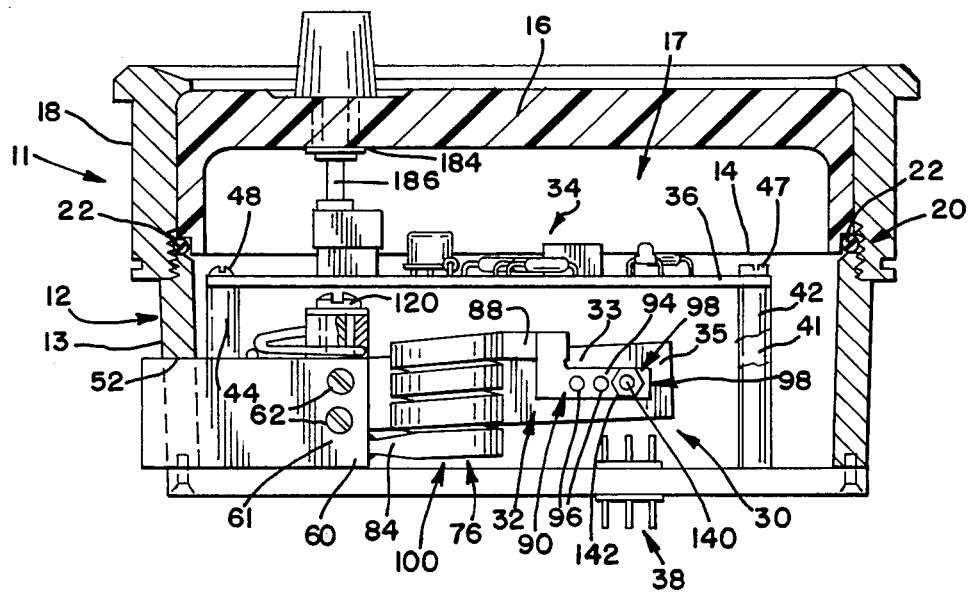
FIG. 4 is a view similar to that of FIG. 2, but showing the other side of the instrument substantially along line 4—4 of FIG. 1.

Diagrammatically illustrated in FIG. 1 is a differential pressure transmitter 10 that comprises pressure transducer instrument 11 that includes housing 12 comprising a housing member 13 (that may be formed from a suitable metallic material, such as aluminum or aluminum alloy or suitable plastic), having an open end 14 closed by a cover 16 to form the housing chamber 17. Instrument 11, by way of example insofar as the sensing transducer and related components are concerned, is similar to the instrument disclosed in said Phillips and Dirks U.S. Pat. No. 4,385,525. Cover 16, following the disclosure of the said Phillips and Dirks U.S. Pat. No. 4,385,525, is preferably formed from an opaque rigid high strength plastic material, such as polyethylene, or polycarbonate, and is held in place by an annular cap or bezel 18 (that may be formed from the same material as housing member 12) threadedly secured to the housing member 13 as indicated at 20 in FIG. 2. The cap or bezel 18 presses the cover 16 in sealing relation to the housing member 13 by bearing against suitable O ring seal 21 interposed between the cover 16 and the housing member 13, where indicated in FIGS. 2 and 4. The instrument back or base plate 22 is secured to housing member by appropriate screws 23 (applied to base plate holes 25).

The instrument 11 further comprises a suitable electro-mechanical transducer 30 which, for illustrative purposes, is shown in the form of leaf spring 32 that is cantilever mounted within the instrument chamber 17 and has its live length 33 arranged in the manner described in said Phillips and Dirks U.S. Pat. No. 4,385,525 to have a full Wheatsone bridge strain gauge arrangement for forming the indicated transducer 30 that is powered by the electronic circuit 34 that may be the same as that disclosed in said Phillips and Dirks patent (if a five wire signal transmission system is desired), it being mounted inside the instrument 11 on associated printed circuit board 36. The circuit board 36 is arranged as disclosed in said Phillips and Dirks patent, and is applied to the instrument 12 in overlying relation to and spaced from the leaf spring 32 so as not to interfere with the deflections of the leaf spring live length 33 that are effected by the practice of the present invention.

As disclosed in said Phillips and Dirks patent, the electronic circuit 34 functions to supply a constant direct voltage to the strain gauge that forms the leaf spring type transducer 30, with the electronic circuit 34 being connected through suitable plug assembly 38 to a suitable regulated power supply (not shown) for energization purposes. Where sensing transducers of either the capacitive type, or the Hall effect type, are alternately employed, the electronic circuit involved is to provide the same signal as electronic circuit 34.

In the form shown, the circuit board 36 is shown mounted on a pair of end pedestals 40 and 42 at one end of board 36 and a single pedestal 44 at the other end of the board 36. The pedestals 40 and 42 are identical in nature and length and at like ends are suitably screw threadedly connected on the instrument back or base plate 22 at the respective apertures 43 (where they are respectively seated in annular seats 45 (see FIG. 3). The circuit board 36 itself is appropriately screw threadedly connected to the other ends of the pedestals 40 and 42, as by employing suitable screws 47 (see FIGS. 2 and 4).

At the other end of the circuit board 36 and against the back or base plate 22 and below the pedestal 44 is fixedly mounted the mounting block 46 that is held in place by suitable screws affixing same to the instrument back or base plate 22 at spaced points along the median portion 49 of block 46 (see FIG. 3), though it is to be understood that any suitable arrangement may be employed to fix the mounting block 46 to back plate o4 base 22. Suitable screw 48 mounts the circuit board 36 on pedestal 44, which pedestal 44 is biased against the mounting block 46 by the connection of board 36 at pedestals 40 and 42 by screws 47 (in the illustrated embodiment).

The mounting block 46 serves several functions in accordance with the present invention. It is generally parallelipiped in configuration, and defines an end portion 50 that projects outwardly of the housing 11, the housing member 13 being formed to define U-shaped window 52 that is shaped so as to be in substantially complementary relation to the top and sides of the outwardly extending end 50 of the mounting block 46. The mounting block end 50 is formed to define the usual threaded socket and associated boring generally indicated by reference numerals 56 and 58 to which the respective tubing connections (not shown) may be secured that are to connect the instrument 11 to the sources of fluid pressure to be monitored, with the higher pressure connection normally being made to threaded socket 56 and the lower pressure connection normally being made to the threaded socket connection 58.

The mounting block 46 also mounts cantilever fashion the leaf spring 32, with the mounting block for this purpose having an inner end 60 (see FIGS. 2 and 3) provided on side 61 (see FIGS. 3 and 4) with a pair of screws 62 in threaded relation to the mounting block 46 that bear against clamping plate 70 (see FIG. 3) that clamps the fixed end 66 of the leaf spring 32 against the planar clamping surface 68 of a clamping plate 64 that is in turn clamped against the planar shoulder 72 that is defined by the mounting block 46 itself. Of course, leaf spring 32 may be cantilever mounted in chamber 17 at its end 66 in any other suitable manner.

Figure 3:
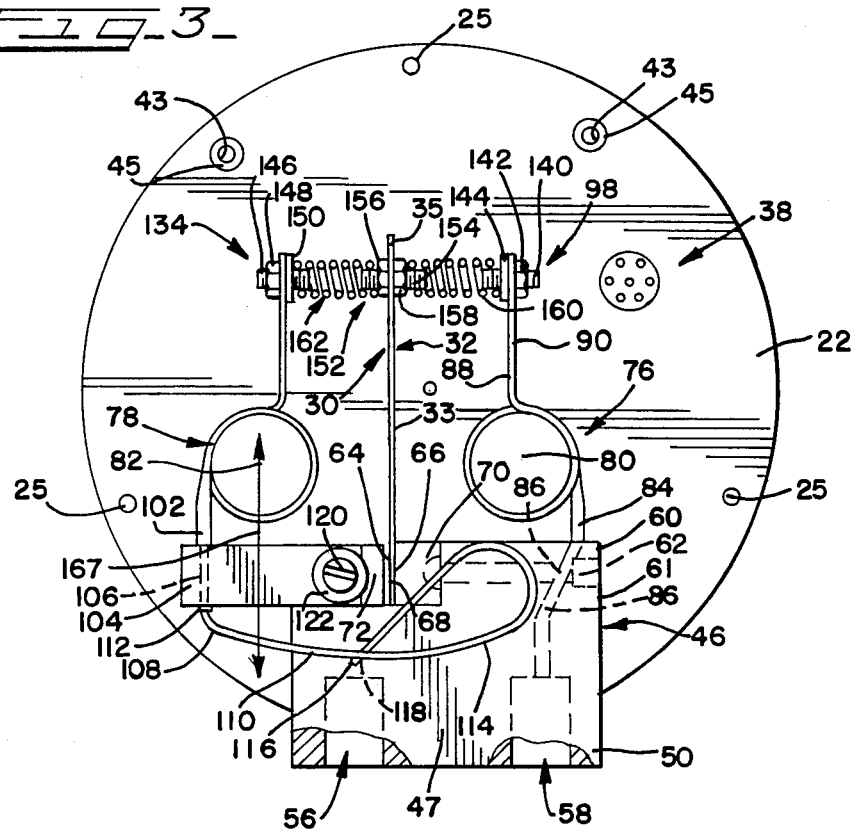
FIG. 3 is a top plan view of the instrument, taken substantially along line 3—3 of FIG. 2, with the instrument housing (except for the housing back plate) and the instrument circuit board mounting pedestals, being omitted.

Operably associated with the illustrated strain gauge type sensing transducer 30 are first bourdon tube 76 and a second bourdon tube 78. As indicated in FIG. 3, the bourdon tubes 76 and 78 are more or less equally spaced from leaf spring 32 on either side thereof and are oppositely coiled about the respective axes 80 and 82 that extend generally normally of the instrument base or back plate 22. The bourdon tube 76 has its end 84 joined to the mounting block 46 by brazing or the like, in alignment with a conduit 86 that communicates between threaded socket 58 and the bore of tube 76. Tube 76 at its other end 88 is suitably sealed and connected by brazing or the like to output lever 90 that is in the form of an "L" shaped length of relatively rigid sheet metal defining a rectilinear shank 94 provided with a number of apertures 96 to which the screw and nut fastening device 98 may be applied in a non adjusting manner, as will be described hereinafter. Tube 76 is shaped to define convoluted portion 100 that is of generally cylindrical and helical configuration, between its respective ends 84 and 88.

Tube 78 has its end 102 suitably affixed to pivotally mounted but normally stationary block 104 in alignment with cross passage 106 thereof to which the end 108 of a flexible metal tube 110 is brazed as at 112 in alignment with the cross passage 106 of block 104 (which during normal operation of instrument is fixed against pivoting by the clamping action of screw 120). The flexible tube 110 is bent to form open loop 114 and bring its end 116 into alignment with passage 118 of the mounting block 46 that communicates with the threaded socket 56. The block 104 is pivotally connected to mounting block 46 by suitable screw 120 seated against washer 122 and passing through the block 104 into threaded connection with mounting block 46 for frictional clamping of the block 104 in surmounted relation on mounting block 46, so that block 104 is not freely pivotally mounted on mounting block 46. The block 104 may be mounted on one or more shims 124 (see FIG. 2).

The other end 126 of the tube 78 is sealed and connected, by brazing or the like, to output lever 128 that is in the form of an L shaped strip of relatively rigid sheet metal defining a rectilinear shank 130 formed to define a rectilinearly elongated adjustment aperture or opening 132, to which is applied in the illustrated embodiment, screw and nut device 134 that connects the output lever 128 in biased relation to the leaf spring free end 35, as indicated in FIG. 3, as will be hereinafter described. Opening 132 is elongated longitudinally of shank 130, and the shanks 94 and 130 of the respective output levers 90 and 128 are disposed nominally in substantially parallel relation, as indicated in FIG. 3.

The tube 78 defines convoluted portion 136 between its ends 102 and 126 that has the same helical and cylindrical configuration as the convoluted portion 100 of spring 76, except that the two tube convoluted portions are of opposite hand, and are equally convoluted in opposite directions about the respective axes 80 and 82.

It is a feature of the invention that the output levers 90 and 128 be spring biased against, in the case of the illustrated embodiment, the free end 35 of leaf spring 32. For this purpose the screw and nut device 98 of bourdon tube 76 comprises a short threaded shank 140 applied to one of the apertures 96 on which nuts 142 and 144 are turned up against the output lever 90 on either side thereof in clamping relation thereto.

The screw and nut device 134 or bourdon tube 78 is similar to the screw and nut device 98, and comprises a short length of threaded shank 146 that extends through the enlarged opening or aperture 132 of the output lever 128 and has nut 148 and 150 turned up against either side of same to clamp the output lever rectilinear portion 130 therebetween. The aperture 132 is elongate longitudinally of the shank 130 of output lever 128.

Adjacent the free end 35, of the illustrated embodiment leaf spring 32, a similar screw and nut clamping device 152 is provided, comprising the short threaded shank 154 that extends through a suitable aperture provided for that purpose in the leaft spring end 35, with the nuts 156 and 158 being turned up into clamping relation with the leaf spring 32; interposed between the nuts 144 and 158 is a helical compression spring 160, while an identical compression spring 162 is interposed between the nuts 150 and 156, whereby the output levers 90 and 128 of the respective tubes 76 and 78 are resiliently connected to the leaf spring 32 adjacent its free end, and whereby the output levers 90 and 128 of the respective tubes 76 and 78 act on the leaf spring 32 with an essentially balanced biasing action. The threaded shanks 140, 146 and 154, the apertures to which they are applied, and the springs 160 and 162, are in coaxial relation in the neutral or null position of leaf spring 32.

In effecting installation of the instrument 11 as a differential pressure transmitter, the electronic circuit 34 has connections associated in a conventional manner with the housing plug assembly 38 to a suitable regulated power supply (not shown) for energization purposes. The housing plug assembly 38 is suitably affixed in leak free relation to the housing back or base plate 22. As diagrammatically indicated in FIG. 1, the regulated power supply is also suitably electrically connected to, for instance, controller 163, and a digital readout device 165 of a conventional type is also normally provided for either local or remote readout of pressures monitored by the instrument 11.

It is a feature of the present invention that the output lever 128 of the bourdon tube 78 not only is connected to the sensing transducer employed, and in the illustrated embodiment, to screw and nut device 134 of the illustrated leaf spring type strain gauge 30, but also for adjustment lengthwise of its rectilinear portion 130 (as indicated by the double headed arrow 167 of FIG. 3), by reason of the threaded shank 146 (of device 134) being located in elongate aperture 132, for tube adjustment purposes as part of the calibration of the instrument 11.

Where sensing transducers of the alternate capacitive type or Hall effect type are employed, instead of a leaf spring strain gauge transducer, the output levers 90 and 128 are similarly spring biased against the movable component of the transducer employed, with the output lever 128 being adjustable in a manner similar to that disclosed, as will be apparent to those skilled in the art.

CALIBRATION OF THE TRANSMITTER INSTRUMENT

Before the instrument 11 is put into use, it is calibrated to compensate for inequalities in the two tubes 76 and 78 that necessarily occur during the course of their manufacture and installation, to insure a zero reading of the instrument whenever equal static pressures are imposed upon the bores of the two tubes 76 and 78. In this connection the exteriors of tubes 76 and 78, and chamber 17, are not subjected to other than ambient pressure. Calibration is done before circuit board 36 is fastened in place.

One way of calibrating instrument 11 is as follows:

It is conventional practice in this field that the regulated power supply to which the circuit 34 is connected has a current to the sensing pressure transducer that is in the range of from about 4 to about 20 milliamps with 4 milliamps being preferred. Assuming that a current of 4 milliamps is supplied to the sensing transducer 30 of which the leaf spring 32 is a part (in the illustrated embodiment), and that the two bourdon tubes 76 and 78 are separately connected by way of the respective threaded sockets 56 and 58 and associated conduits to separate sources of gas or air, or separate sources of liquid, and the instrument 11 is conventionally connected to suitable and conventional digital readout device 165, under zero pressure conditions at the sources of pressure for the respective tubes 76 and 78 the readout device 165 should indicate a current of 4 milliamps (this being the aforementioned zero datum position for the leaf spring strain gauge type sensing transducer that is illustrated; the other types of sensing transducers referred to have a similar zero datum position).

The fluid pressure to which both tubes 76 and 78 are internally subjected is then increased to the maximum that the instrument 11 is expected to be subjected to in practice (approximately 500 psi total pressure for the illustrated embodiment), and the readout device 165 inspected. If the tubes 76 and 78 are acting equivalently for equal pressures exposed to the respective tubes 76 and 78 internally thereof, the readout device 165 will indicate the 4 milliamp current. However, it is likely that at this stage a different milliamp reading will be observed at the readout device 165, which indicates that the tubes 76 and 78 are acting differently because of imperfections or differences in workmanship and the like. In such an event, for the illustrated embodiment, the screw and nut device 134 is then loosened, as is screw 120, and the output lever 128 is adjusted longitudinally of its rectilinear length 130 with respect to the threaded shank 146, and with the tube 78 (and the block 104 to which tube 78 is attached) being pivoted about the axis of screw 120 as needed, to bring the readout of the device 165 back to the 4 milliamp figure, after which the screw and nut device 134 is retightened to clamp its nuts 148 and 150 against the opposite sides of the output lever 128, and screw 120 retightened to fix block 104 against pivoting movement. The pivotal mounting of the block 104 to which the end 102 of the bourdon tube 78 is connected, and the flexible nature of the tubing 110 accommodate the moving of the tube 78 toward or away from the threaded shank 146 of screw and nut fastening device 134 as may be needed to return the reading of the ditigal readout device 165 to 4 milliamps. The circuit board 36 is then fastened in place as indicated in the drawings. Where sensor transducers of one of the other types herein referred to is employed instead of the leaf spring strain gauge type sensor illustrated a similar adjustment of the tubes 78 is made to return the reading of readout device 165 to 4 milliamps.

The instrument 11 then may be employed as a differential pressure transmitter using conventional connections for this purpose, such as those outlined at pages 14 and 15 of Dwyer Bulletin E-50.

The invention contemplates that the instrument 11 has a span adjust comprising the respective knobs 180 and 182 of which the knob 180 is coupled in the assembled relation of the device to the potentiometer of circuit 34 that effects span adjust, while the knob 182 is coupled to the potentiometer of the circuit 34 that provides for the zero adjust, in the manner disclosed in said Phillips and Dirks patent. The circuit board 36 may be of any conventional type, and ordinarily involves a dielectric, rigid, or substantially inflexible, substrate formed from glass-epoxy or phenolic based type material formed to the desired shape and having the desired conductive surfacing suitably formed thereon (not shown).

The mounting of the circuit board 36 in the instrument chamber 17, assuming that the wiring connections involved are completed, involves resting the portions of the circuit board 36 that are to be applied to the respective pedestals 40 and 42 44 that have been preapplied to the instrument base or back plate 22. Suitable screws 47 secure the circuit board 36 to the respective pedestals 40 and 42, while screw 48 secures the circuit board tp pedestal 44.

The knobs 180 and 182 are permanently mounted in the cover, as by applying suitable locking rings 184 (see FIGS. 2 and 4), with the knobs 180 and 182 each having keyed to same a planar shank 186 that is adapted to fit into a socket or slot in a rotatable component of the respective potentiometers above referred to in connection with the instrument span adjust and zero adjust. In applying the instrument cover 16 and bezel or cap 18 to the housing member 13, the shanks 186 of the respective knobs 180 and 182 have to be suitably applied to the sockets of the indicated potentiometer devices forming the instrument span adjust and zero adjust, all as disclosed in said Phillips and Dirks patent.

With regard to the instrument span adjust and zero adjust above referred to, instead of the knob type adjustments represented by the knobs 180 and 182, the potentiometer devices involved may be equipped with adjustment rollers slotted for application thereto of a screw drive blade through apertures located at the locations of the respective knobs 180 and 182, which apertures (not shown) may be removably closed by suitable access plugs, in any convenient manner, so that the adjustments for these components are not readily accessible, as disclosed in said Phillips and Dirks patent.

It will therefore be seen that the invention provides a special type of sensing transducer instrument useful as a differential pressure transmitter, and that may be calibrated before use so that the bourdon tubes 76 and 78, which act oppositely of each other, do act equivalently on the movable element or component of the sensing transducer employed, for equal pressures exposed to the bores of the respective tubes 76 and 78.

The electronic circuit 34, similar to the disclosure of said Phillips and Dirks patent, when excited as indicated in that patent, insures the needed uniform or constant milliamp input to the leaf spring type strain gauge 30. The signal provided by the instrument 11 may be, for absolute gas and/or air pressures, or liquid pressures positive, negative, or differential, and the output signal provided by the instrument 11 can be used for remote indication of the pressures involved by employing a ditigal readout device of the type indicated, or for application to control systems, etc.

The instrument 11 may be employed to measure differential pressures in the range of from about 10 to about 500 psi or more, with the tubes 76 and 78 being formed from a material suited for that purpose, such as Beryllium copper tubing; tubing formed from other materials such as Inconel, phosphur bronze, stainless steel are also satisfactory. In one practical embodiment of the invention, the tubes 76 and 78 are each formed from Beryllium copper tubing of ⅛th inch outer diameter and 0.005 inch wall thickness. Reference may be had to by U.S. Pat. No. 4,374,475, granted Feb. 22, 1983 for an illustration of a differential pressure gauge having a single bourdon tube type pressure sensing device.

Where the older five wire circuit is employed in connection with the instrument strain gauge 30 that is illustrated, the strain gauge of the type disclosed in the aforereferred to Phillips and Dirks U.S. Pat. No. 4,385,525 may be employed. However, for the newer two wire circuit type system, a silicone type strain gauge is preferably employed as part of the leaf spring 32, which permits the application of strain gauges to both sides of the leaf spring.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a differential pressure transducer including a housing defining a chamber, a sensing transducer in the chamber, and comprising an electro-mechanical transducer having a movable component and being electrically connected into a signal conditioning electronic circuit means within the chamber that provides a signal in accordance with the deflection of the sensing transducer movable component from a zero datum position, means for electrically connecting the circuit means to a source of electrical energy externally of the housing, pressure sensing means mounted in the chamber, and means for connecting the pressure sensing means to a source of pressure fluid, with the pressure sensing means acting on the sensing transducer for effecting a signal generated by the circuit that is proportional to the change in pressure sensed, the improvement wherein:

said pressure sensing means comprises a first bourdon tube mounted on one side of the sensing transducer movable component, and a second bourdon tube mounted on the other side of the sensing transducer movable component, one end of each of said tubes being sealed and mounting an output lever, with said one ends of said tubes projecting similarly from the respective tubes, With said levers being disposed into generally parallel relation, means for resiliently connecting the respective output levers to the sensing transducer movable component for essentially balanced biasing action of said output levers on said sensing transducer movable component, with the means for connecting the pressure sensing means to a source of pressure fluid comprising the other ends of said tubes each including means for being separately connected to separate conduit means including means for connecting the respective conduit means to a separate source of pressure fluids, and with one of said output levers being adjustable lengthwise thereof for setting same at its effective length at which said tubes react equivalently when both are exposed to the same fluid pressure at said separate sources of the pressure fluids.

2. The improvement set forth in claim 1 wherein:

said tubes intermediate said ends thereof are respectively convoluted about axes extending generally normally of the movement plane of the sensing transducer movable component, with the tube that mounts said adjustable lever having its said other end mounted for pivotal adjustment relative to the housing about an axis that substantially parallels the convolute axis thereof.

3. The improvement set forth in claim 1 wherein said resilient connecting means comprises a first compression spring interposed between said one output lever and the sensing transducer movable component and a second compression spring interposed between the other of said output levers and the sensing transducer movable component.

4. The improvement set forth in claim 3 including:

releasable connecting means for connecting said one output lever to said first compression spring, said one output lever being formed to permit adjustment of the effective length thereof on release of said connecting means.

5. In a pressure transducer of the strain gauge type including a housing defining a chamber, a leaf spring in the chamber, clamping means for mounting the leaf spring in the chamber adjacent one end of the spring cantilever fashion for defining the live length of the leaf spring and a fulcrum about which the leaf spring moves from side to side in a plane extending normally of the leaf spring, with the leaf spring live length being the leaf spring movable component and the leaf spring movable component comprising an electro-mechanical strain gauge sensing transducer electrically connected into a signal conditioning electronic circuit means within the chamber that provides a signal in accordance with the deflection of the leaf spring live length from a zero datum position, means for electrically connecting the circuit means to a source of electrical energy externally of the housing, pressure sensing means mounted in the chamber, and means for connecting the pressure sensing means to a source of pressure fluid, with the pressure sensing means acting on the leaf spring adjacent the other end of same for actuating the strain gauge transducer for effecting a signal generated by the circuit that is proportional to the change in pressure sensed, the improvement wherein:

said pressure sensing means comprises a first bourdon tube mounted on one side of the leaf spring, and a second bourdon tube mounted on the other side of the leaf spring, one end of each of said tubes being sealed and mounting an output lever, with said levers being disposed generally parallel to said leaf spring, means for resiliently connecting the respective output levers to the leaf spring adjacent the other end of the leaf spring for essentially balanced biasing action of said output levers on said leaf spring, with the means for connecting the pressure sensing means to a source of pressure fluid comprising the other ends of said tubes each including means for being separately connected to separate conduit means including means for connecting the respective conduit means to a separate source of pressure fluids, and with one of said output levers being adjustable lengthwise thereof for setting same at its effective length at which said tubes react equivalently when both are exposed to the same fluid pressure at said separate sources of the pressure fluids.

6. The improvement set forth in claim 5 wherein:

said tubes intermediate said ends thereof are respectively convoluted about axes extending generally normally of the movement plane of the leaf spring, with the tube that mounts said adjustable lever having its said other end mounted for pivotal adjustment relative to the housing about an axis that substantially parallels the convolute axis thereof.

7. The improvement set forth in claim 5 wherein said resilient connecting means comprises a first compression spring interposed between said one output lever and the leaf spring and a second compression spring interposed between the other of said output levers and the leaf spring.

8. The improvement set forth in claim 7 including:

releasable connecting means for connecting said one output lever to said first compression spring, said one output lever being formed to permit adjustment of the effective length thereof on release of said connecting means.

9. In a fluid pressure transducer assembly of the strain gauge type including a housing defining a chamber, a leaf spring in the chamber, clamping means for mounting a leaf spring in the chamber adjacent one end of the spring cantilever fashion for defining the live length of the leaf spring and a fulcrum about which the leaf spring moves from side to side in a plane extending normally of the leaf spring, with the leaf spring live length being the leaf spring movable component and the leaf spring movable component comprising an electro-mechanical strain gauge sensing transducer electrically connected into a signal conditioning electronic circuit means with the chamber that provides a signal in accordance with the deflection of the leaf spring live length from a zero datum position, means for electrically connecting the circuit means to a source of electrical energy externally of the housing, pressure sensing means mounted in the chamber, and means for connecting the pressure sensing means to a source of pressure fluid, with the pressure sensing means acting on the leaf spring adjacent the other end of same for actuating the strain gauge transducer for effecting a signal generated by the circuit that is proportional to the change in pressure sensed, the improvement wherein:

said pressure sensing means comprises a first bourdon tube mounted on one side of the leaf spring, and a second bourdon tube mounted on the other side of the leaf spring, one end of each of said tubes being sealed and mounting an output lever, with said lever being disposed generally parallel to said leaf spring, means for resiliently connecting the respective output levers to the leaf spring adjacent the other end of the leaf spring for essentially balanced biasing action of said output levers on said leaf spring, with the means for connecting the pressure sensing means to a source of pressure fluid comprising the other ends of said tubes each including means for being separately connected to separate conduit means including means for connecting the respective conduit means to a separate source of pressure fluids, a mounting block being fixed to the housing, and with one of said output levers being adjustable lengthwise thereof for setting same at its effective length at which said tubes react equivalently when both are exposed to the same fluid pressure at said separate sources of the pressure fluids.

10. The improvement set forth in claim 9 wherein:

said tubes intermediate said ends thereof are respectively convoluted about axes extending generally normally of the movement plane of the leaf spring, with the tube that mounts said adjustable lever having its said other end mounted for pivotal adjustment relative to the housing about an axis that substantially parallels the convolute axis thereof, said mounting block projecting externally of said housing for external exposure of said means for connecting said respective conduit to separate sources of pressure fluids.

11. The improvement set forth in claim 9 wherein said resilient connecting means comprises a first helical compression spring interposed between said one output lever and the leaf spring and a second helical compression spring interposed between the other of said output levers and the leaf spring.

12. The improvement set forth in claim 11 including:

releasable clamping means for releasably clamping said one output lever to said first compression spring, said one output lever being formed to permit adjustment of the effective length thereof on release of said releasably clamping means.

13. The improvement set forth in claim 12 wherein:

said releasable clamping means for releasably clamping said one output lever is of the screw and nut type.

14. The improvement set forth in claim 9 wherein:

said mounting block is formed to receive the one end of the leaf spring and includes threaded means for forming the leaf spring mounting clamping means.

* * * * *